United States Patent [19]

Slautterback et al.

[11] 4,195,755

[45] Apr. 1, 1980

[54] APPARATUS FOR DISPENSING THERMOPLASTIC MATERIAL FROM CONTAINERS

[75] Inventors: Fred A. Slautterback, Carmel Valley; R. Blakeley Honeyman, Carmel, both of Calif.

[73] Assignee: Lockwood Technical, Inc., Monterey, Calif.

[21] Appl. No.: 920,278

[22] Filed: Jun. 29, 1978

[51] Int. Cl.$^2$ .......................... B67D 5/62; B67D 5/48
[52] U.S. Cl. .............................. 222/146 HE; 219/230; 219/421; 222/260
[58] Field of Search ............... 219/230, 421, 457, 467, 219/542, 536; 222/146 R, 146 H, 146 HE, 260, 261, 262

[56] References Cited

U.S. PATENT DOCUMENTS

| | | | |
|---|---|---|---|
| 3,412,903 | 11/1968 | Van Riper, Jr. et al. | 219/421 X |
| 3,877,610 | 4/1975 | Dickey | 222/146 HE |
| 4,073,409 | 2/1978 | Gardner et al. | 222/260 X |
| 4,090,640 | 5/1978 | Smith et al. | 222/146 HE |

FOREIGN PATENT DOCUMENTS

648006 9/1962 Canada .................................. 222/146 H

*Primary Examiner*—David A. Scherbel
*Attorney, Agent, or Firm*—Thomas H. Olson

[57] ABSTRACT

Apparatus for dispensing thermoplastic material, such as hot melt glue, from a shipping container, such as a 55-gallon drum, including a heated follower and mechanism for urging the follower into the container against the surface of the thermoplastic material. A plurality of groups of conductive fins secured to the follower for transferring heat to the material so as rapidly to heat the material to a flowable condition. Each group of fins includes a plurality of parallel fins which define channels therebetween, the channels being oriented so as to afford fluid flow toward the center of the follower, a location at which the inlet of a pump is mounted in receiving relation to the heated material. The thickness of the fins and the width of the channels are established to expedite heat exchange between the heated follower and the material as well as provide a low impedance flow path for the material.

9 Claims, 9 Drawing Figures

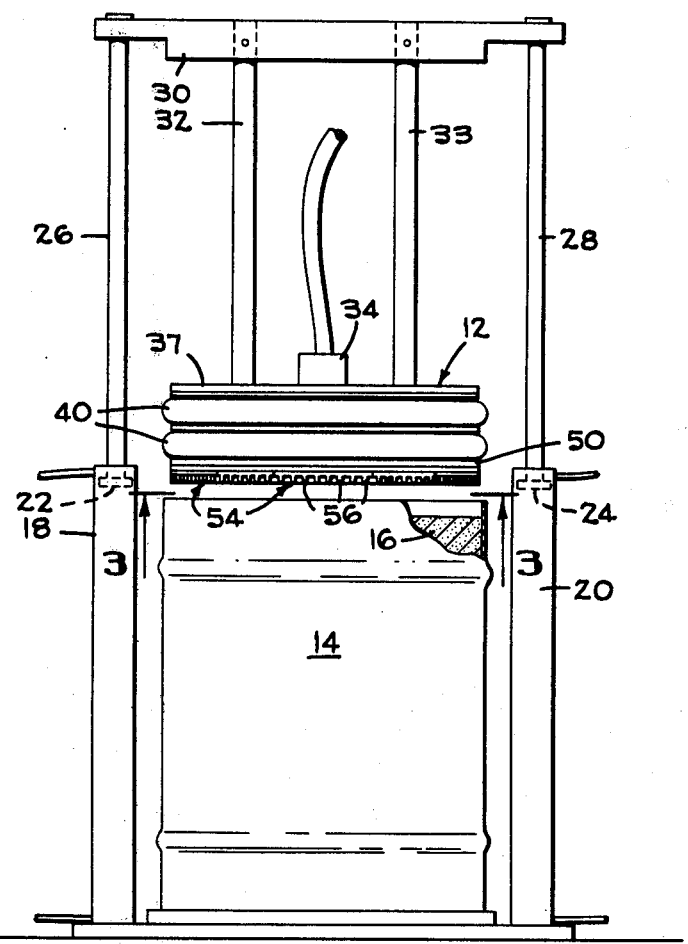
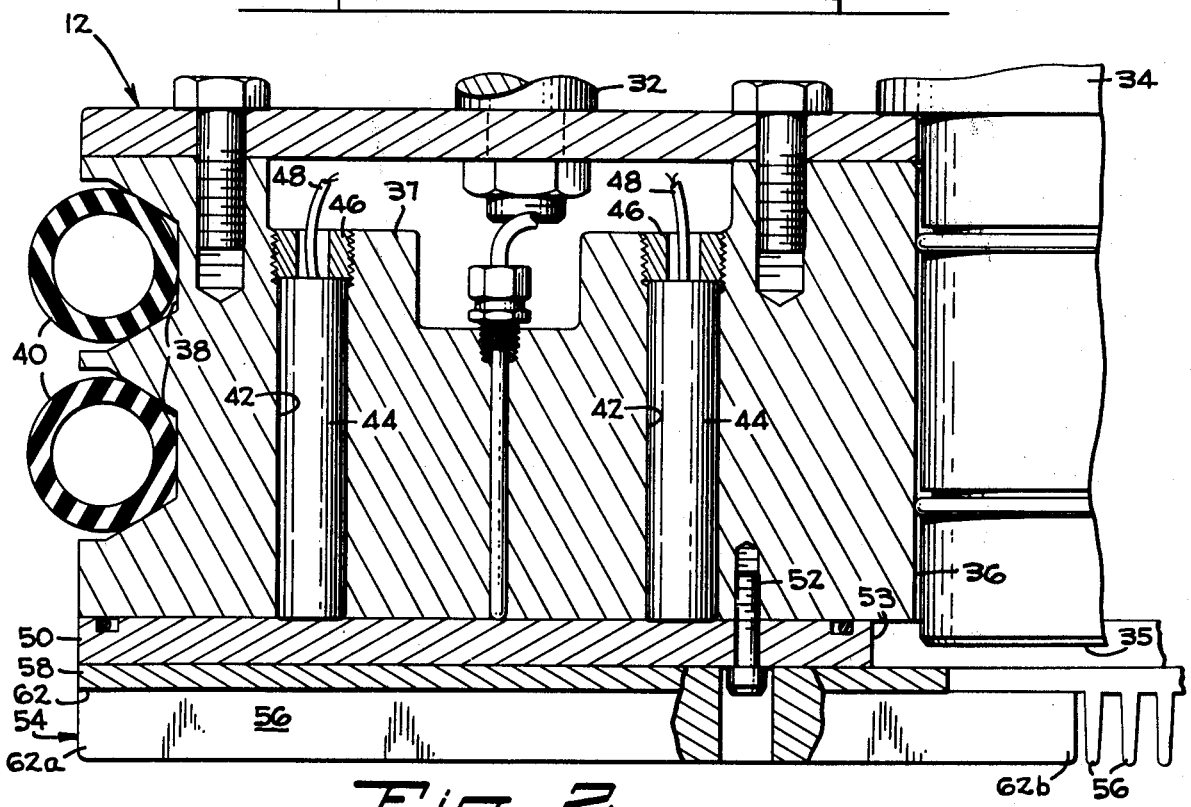

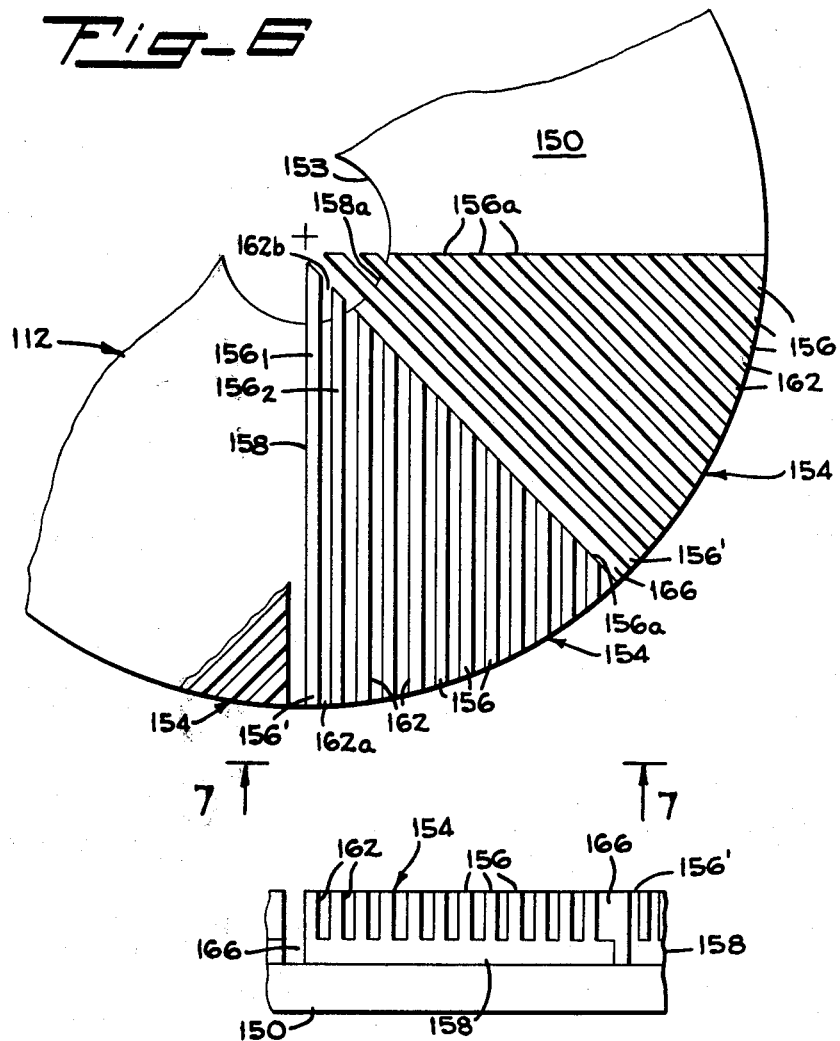

APPARATUS FOR DISPENSING THERMOPLASTIC MATERIAL FROM CONTAINERS

BACKGROUND OF THE INVENTION

1. Field of the Invention

This invention relates to a dispenser for thermoplastic material and more particularly to such dispenser for unloading hot melt adhesive material and the like from a drum or like container.

2. Description of the Prior Art

The following U.S. Patents disclose dispensers or unloaders for thermoplastic material wherein a heated platen or follower is lowered into a drum of such material in order to heat the material to a flowable condition after which the flowable material is pumped away:

U.S. Pat. Nos. 2,522,652; 3,031,106; 3,282,469; 3,412,903; 3,637,111; 3,758,003; 3,972,229; 4,073,049.

U.S. Pat. No. 3,982,669 discloses in FIG. 10 thereof a finned platen wherein the fins extend radially of the platen. The spaces between the radial fins converge toward the center of the platen.

There is also prior art showing similar structures, without any heating means, for dispensing material, such as oil or grease, that is flowable at ambient temperatures. Among these are U.S. Pat. Nos. 2,221,763; 2,630,248 and 3,113,705.

SUMMARY OF THE INVENTION

According to the present invention, the surface of the platen or follower that contacts the thermoplastic material is provided with a plurality of groups of fins, the fins in each group being mutually parallel and spaced apart to define channels therebetween. The groups are sufficient in number and configuration so as to be, in combination, substantially coextensive with the follower surface and are oriented so that one end of each channel is outward of the opposite end of the channels. The innermost ends of the channels communicate with passages which facilitate movement of the material toward a centrally located pump inlet.

An object of the invention is to speed up the unloading of containers of thermoplastic material and to increase the flow rate of the material without increasing power input to the apparatus. This object is achieved in accordance with the present invention by providing a plurality of heat conductive fins which are spaced apart to define channels therebetween and by dimensioning the fins and the channels so that the cross-sectional area of the channels and of the fins affords optimum heat delivery to the thermoplastic material and movement thereof after it is rendered flowable. This relationship improves heat conduction from a heater in the follower to the thermoplastic material by minimizing the distance between the material and a heated surface, an advantageous condition in view of the relative poor heat conductivity of hot melt glues and like thermoplastic materials.

Another characteristic of the apparatus of the invention that contributes to rapid unloading of a container is that the channels defined between the fins do not converge toward the center thereby avoiding wedging of partially solid slugs of hot melt material in the channel which would retard flow toward the centrally located pump inlet.

A further object is to provide an unloader for thermoplastic material which can be manufactured and maintained efficiently. This object is achieved by forming each of the above mentioned groups of fins as an integral assembly that has a shape equivalent to that of a sector of a circle. Accordingly, the heat exchange surface of the follower can be fabricated from a number of identical sector shaped groups of fins.

A feature and advantage of constructing the fin groups as described in the preceding paragraph is that such sector shaped groups can be constructed of off-the-shelf, commercially available aluminum extrusion stock which is available with dimensional relationships appropriate to the requirements of the present invention.

The foregoing, together with other objects, features and advantages, will be more apparent after referring to the following specification and the accompanying drawings.

BRIEF DESCRIPTION OF THE DRAWINGS

FIG. 1 is an elevation view of a drum unloader apparatus equipped with the heat exchange structure according to the present invention.

FIG. 2 is a fragmentary view in cross section of a follower assembly.

FIG. 6 is a fragmentary view similar to FIG. 3 and showing an alternate form of the invention.

FIG. 7 is a view taken along line 7—7 of FIG. 6.

DETAILED DESCRIPTION OF THE PREFERRED EMBODIMENT

Figure 3:
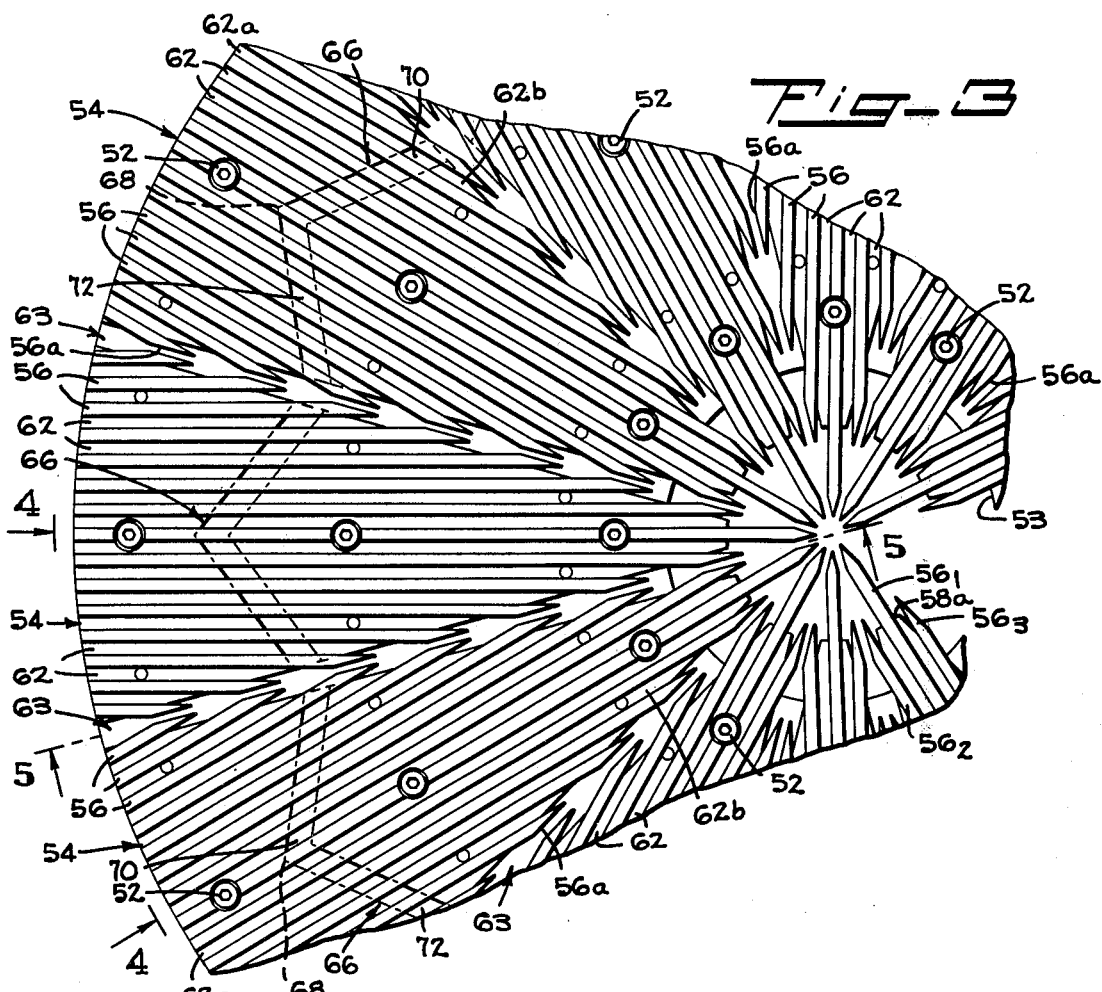
FIG. 3 is a fragmentary view taken along line 3—3 of FIG. 1.

Referring more particularly to the drawings, reference numeral 12 indicates generally a follower that has a shape corresponding to the interior of a container such as a 55-gallon drum 14 which is filled with thermoplastic material 16, hot melt glue exemplifying such thermoplastic material. As indicated in the prior art cited hereinabove, apparatus of this type can be employed to dispense any material which is rendered flowable by application of heat energy thereto, such material being characterized in the present specification and claims as thermoplastic material.

There is mechanism for urging follower 12 into container 14, such mechanism including upstanding hydraulic or pneumatic cylinders 18 and 19 in which pistons 22 and 24 move in response to application of pressure. Secured to pistons 22 and 24 are rods 26 and 28, respectively; spanning the upper end of rods 26 and 28 is a rigid crosspiece 30. Structural members 32 and 33 have their upper ends rigidly fixed to crosspiece 30 and their lower ends fixed to follower 12 so that on application of fluid pressure to the upper end of cylinders 18 and 20, follower 12 is urged downward into container 14 and into contact with the surface of thermoplastic material 16. A pump 34 is mounted on follower 12; the pump has an inlet 35 disposed in an opening 36 formed centrally of follower 12. The apparatus described to this point is more or less conventional and exemplifies structure known in the prior art.

Follower 12 includes a body portion 37 which defines peripheral grooves 38 for supporting flexible tubular seals 40, which serve to seal the space between the periphery of the follower and the inner surface of drum 14. Body 37 is provided with a plurality of bores 42 for supporting electric cartridge heaters 44 therein, the cartridge heaters being retained by a threaded collar 46 and having electrical leads 48 connected to a conventional power source, not shown. Body 37 is constructed of aluminum or like material that is a good heat conductor.

Fixed to the lower surface of body 37 is a circular plate 50 which is secured to the lower surface of body 37 by any suitable means such as screws 52. Circular plate 50 has a central opening 53 in registry with opening 36 in follower 12. Secured to plate 50 are groups 54 of parallelly spaced apart fins 56.

Figure 4:
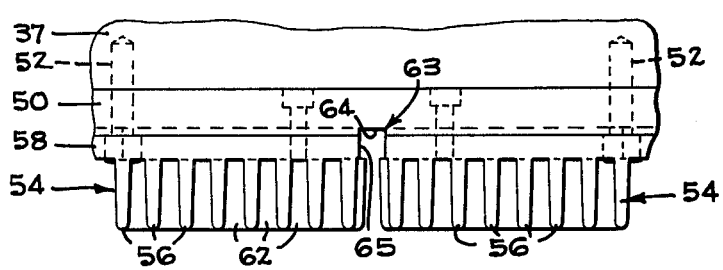
FIG. 4 is a fragmentary side view taken along line 4—4 of FIG. 3.
Figure 5:
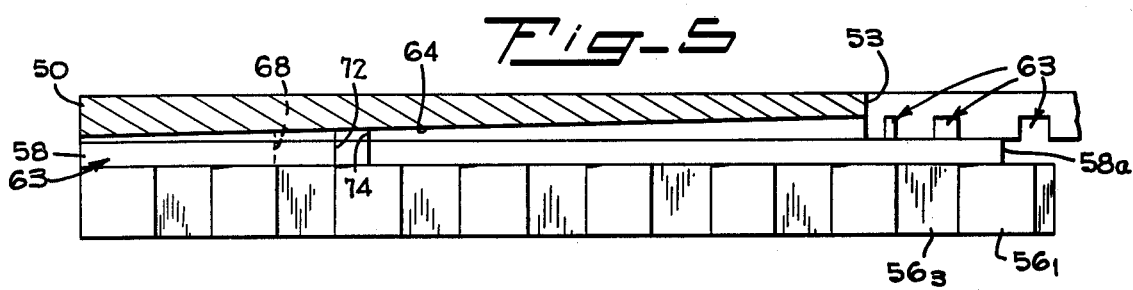
FIG. 5 is a view taken along a radial plane indicated by line 5—5 of FIG. 3.

Referring to FIGS. 3-5, each group 54 has a plurality of fins 56 which are rigid and integral with a base plate 58. Extruded material including base plate 58 and fins 56 is commercially available in numerous sizes. Base plate 58 is formed with bores so that screws 52 can pass through base plate 58 and circular plate 50 to retain both elements onto the lower surface of follower body 37.

In the embodiment of FIGS. 3-5, fin groups 54 are sector shaped and have an angular extent of 30° so that twelve identical groups can be secured to circular plate 50 and the lower surface of follower body 37 whereby the fin groups and fins are substantially coextensive with the lower surface of the follower which in turn is substantially coextensive with the interior cross section of drum 14.

Fins 56 are substantially straight, parallel and spaced apart so as to define between adjacent pairs of fins a channel 62. As can be seen in FIGS. 3 and 4, channel 62 has an outer extremity 62a, an inner extremity 62b, and a uniform cross-sectional shape between the extremities. Accordingly, material in channel 62 that is heated to a flowable temperature can move smoothly toward the center of the follower, and even the presence of semisolid slugs of material will not retard flow because of the uniformity of the cross-sectional shape of the channels.

The inner ends of fins 56 are mitered as at 56a so that when the groups are installed on circular plate 50 no substantial area of the lower surface of the following will be inactive in transferring heat to the thermoplastic material.

At the intersection between adjacent fin groups 54 radially extending passageways 63 are formed. The flow path along channel 62 meets the path in passageway 63 at an obtuse angle so as to facilitate free material flow. Passageways 63 are defined by a radial groove 64 formed in plate 50 and by undercutting base plate 58 as at 65 in alignment with the edge of groove 64. Radial groove 64 can have a uniform cross-section or can continually increase in cross-section toward central opening 53 in order to afford unimpeded flow toward the central opening. Thus, melted material flowing inward along chanel 62 can enter passage 63 without significant restriction. Because the passage has a cross-sectional area equal to or greater than channel 62, the material can flow without significant impedance to opening 53 and to the pump inlet in communication with the opening.

Base plate 58 of fin group 54 can be provided with one or more V-shaped slots 66 which define secondary passages that communicate between channels 62 and passages 63. Each V-shaped slot has an apex 68 at the midpoint of fin group 54 and two legs 70, 72 which extend from the apex and communicate with passages 63 at locations radially inward of the apex. Circular plate 50 can be formed with a similarly shaped slot 74 in alignment with slot 66 to increase the cross-sectional area of the secondary passage and facilitate material flow to radial passages 63.

The inner radial extremity of each fin group 54 is configured to facilitate flow of heated material to the pump inlet 35 through opening 53, to exclude from the pump inlet any pieces of semi-solid thermoplastic material, and to assure that even at the center of follower 12, spaced apart fins 56 will be present to heat the material uniformly. As seen in FIG. 3, base plate 58 is truncated as at 58a and at least some of the fins, designated at $56_1$, $56_2$ and $56_3$, extend beyond the truncated base plate so as to span opening 53. Thus, the entire area in alignment with the pump inlet opening is provided with spaced apart fins which, in addition to delivering heat to the thermoplastic material at the center of the container, also prohibits entry of large semisolid pieces into the pump thus assuring free flow of liquified thermoplastic material to the pump.

In operation, the embodiment of the invention shown in FIGS. 1-5 operates efficiently to heat the top layer of the thermoplastic material to a flowable condition and afford free movement thereof toward opening 53 and pump inlet 35. This is the case because of the uniform distribution of fins 54 throughout the entire area of the follower and because of the similarly uniformly distributed channels between the adjacent fins. Because material within the channels is extremely close to a heated fin surface, the material will be effectively rendered flowable notwithstanding the poor conductivity of typical thermoplastic material. Unimpeded movement of the flowable material from outer channel extremity 62a toward inner channel extremity 62b occurs because of the uniform cross section of the channels. When the material reaches inner channel extremity 62b, it flows freely into radial passages 63. Such passages communicate without reduction in cross-sectional area to central opening 53; the passages have either a uniform cross section or a cross section that increases toward central opening 53 and thus affords free movement of the material. Moreover, because the channels approach the radial passages at an obtuse angle, the material flows smoothly from the channels into the passages.

A system incorporating the present invention provides high speed delivery of thermoplastic material because the heat produced by cartridge heaters 44 is maximally conducted to the thermoplastic material. Such is the case because the thickness of fins 56 as well as the width of channels 62 are established to maximize heat transfer. Because the fins in a fin group are parallel to one another, the melting is uniform throughout the area of the follower. Moreover, parallelism of the fins establishes channels 62 at uniform widths so that melted or partially melted material can flow in the channels without impedance. This advantageous mode of operation should be contrasted with certain prior art structures wherein the provision of fins that extend radially necessarily define between adjacent such fins a passageway that converges and produce a fin spacing near the periphery that is too large to afford efficient melting of the material. Such converging passageways retard or inhibit flow of the melted or semi-melted material toward the centrally located pump inlet.

An alternate form of the invention is shown in FIGS. 6 and 7. Because of the similarities in structure and function between the embodiment of FIGS. 6 and 7 and the embodiment of FIGS. 1–5, the reference numerals employed in connection with FIGS. 6 and 7 are greater by 100 than the reference numerals that designate corresponding elements in the embodiment of FIGS. 1–5. There is a circular disk 150 on which are mounted a plurality of fin groups 154. Each fin group 154 includes a base plate 158 from which extends a plurality of mutually parallel fins 156 which are integral with the base plate. Adjacent pairs of fins 156 define therebetween channels 162 which are of uniform cross-sectional shape from the outer channel extremity 162a to the inner channel extremity 162b. Inner channel extremities 162b terminate at an obtuse angle with a radial passage 166 which is formed in part by cutting off the inner extremity of the fins as at 156a and spacing the same from the radially extending fin 156' of the adjacent fin group.

Radial passages 166 extend to and communicate with opening 153 which is in alighment with inlet 35 of pump 34. Base plate 158 is truncated at 158a on an arcuate line that is congruent to the edge of opening 153. Several fins 156₁, 156₂ project beyond the base plate 158 so as to extend over opening 153 without restricting flow through the opening.

In the embodiment shown in FIGS. 6 and 7, fin groups 154 are formed on sector shaped members each of which has a 45° circumferential extent. This particular circumferential extent is not critical, the important criteria being that channels 162 do not converge toward the center of follower 12, that radial passage 166 communicates with the inner extremities of the channels at an obtuse angle, and that the fins are oriented so that outer channel extremities 162a are radially outward of inner extremities 162b.

The operation of the embodiment of FIGS. 6 and 7 is substantially identical to that described hereinabove in connection with FIGS. 1–5. As the follower is urged downward into the thermoplastic material, heated fins 156 contact the surface of the thermoplastic material and sink thereinto so as to heat the material to render it flowable. As the material becomes flowable, it moves along channels 162 toward inner extremity 162a. Because the channels are of uniform cross section throughout their length no significant impedance to free flow exists. When the heated material reaches radial passages 166, which are larger in cross-sectional area than channels 162, the material moves freely along the radial passage and into opening 153.

Figure 8:
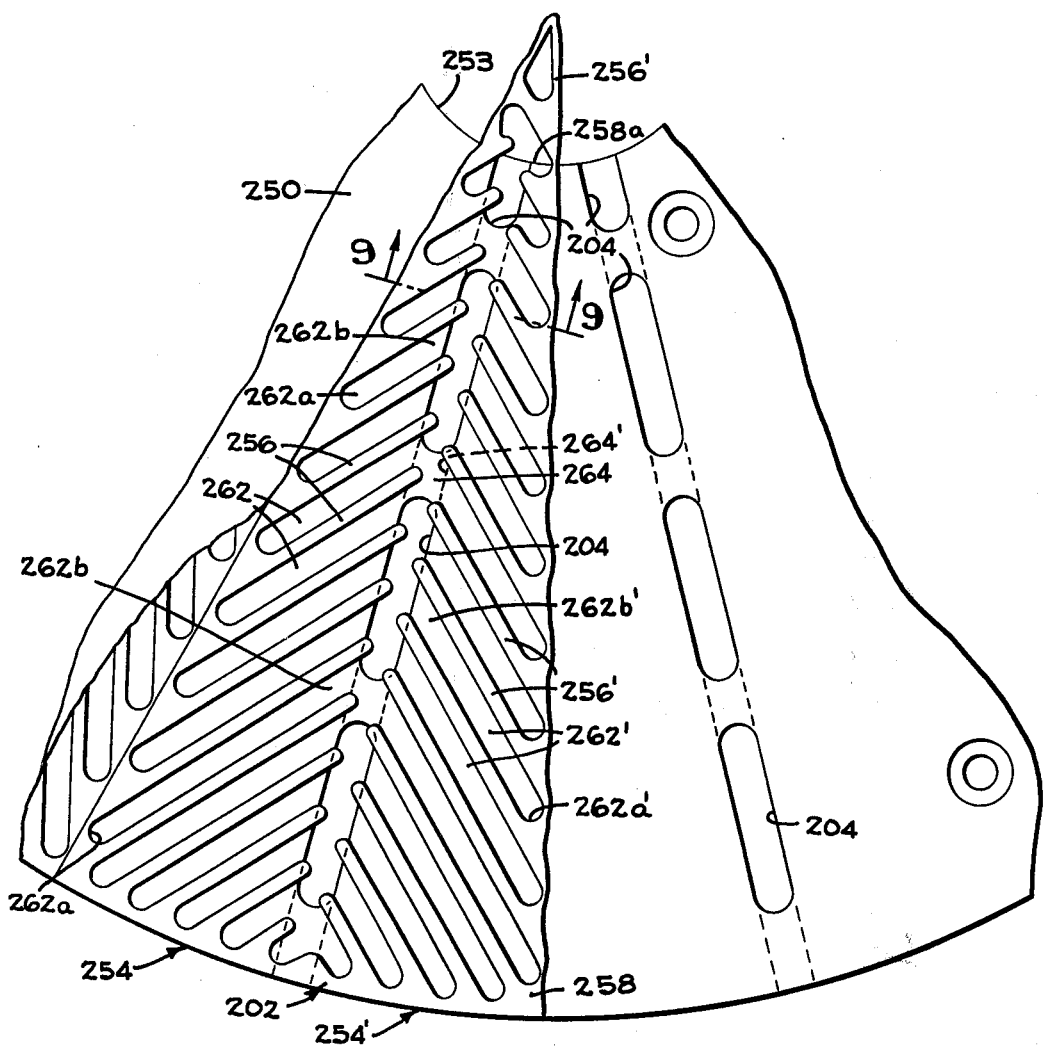
FIG. 8 is a fragmentary view similar to FIG. 3 and showing another alternate form of the invention.
Figure 9:
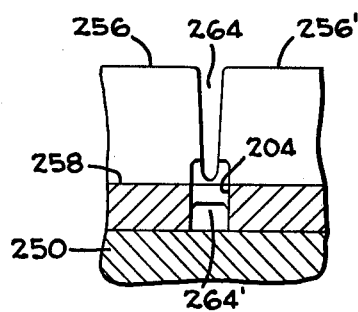
FIG. 9 is a fragmentary cross-sectional view of the structure of FIG. 8, taken along line 9—9 of FIG. 8.

A third embodiment of the invention is shown in FIGS. 8 and 9. Because of similarities in structure and function, the reference numerals employed in identifying certain elements of FIGS. 8 and 9 are greater by 200 than reference numerals employed in FIGS. 1–5 to identify corresponding elements. In the embodiment of FIG. 8 there is shown a plurality of sector shaped units 202. Each sector shaped unit includes two fin groups 254 and 254'. The groups are generally symmetrical about a radial line that bisects unit 202. Group 254 includes a plurality of parallely spaced apart fins 256. The fins are disposed uniformly throughout the lower surface of the follower to afford uniform melting throughout such surface. Between adjacent pairs of fins 256 are formed channels 262, each channel having an outer extremity 262a and an inner extremity 262b. Between the inner and outer extremities channel 262 has a uniform cross section so that molten or semi-solid thermoplastic material therein can move inward toward the pump inlet along the channel without restriction.

Fin group 254' is substantially identical in that there are plural parallelly spaced apart fins 256' between which are formed channels 262' that have outer extremities 262a' and inner extremities 262b'. As can be seen in FIG. 9, fins 256 and 256' are foreshortened at the inner extremities thereof to form a radially extending passage 264. The passage has a cross-sectional extent at least as large as the cross-sectional extent of channels 262 and 262'.

Sector shaped unit 202 includes a base plate 258 with which fins 256 and 256' are integral. The surface of base plate 258 opposite that from which fins 256 and 256' extend defines a continuous slot or passage 264' which is symmetrical of the radial midline of unit 202, in alignment with passage 264, and extends to pump inlet 253. Passage 264' can have either a uniform cross section or a cross section that increases toward the central opening 253. Communicating between passages 264 and 264' are typically a plurality of elongate ports 204 which permit heated thermoplastic material traveling in passage 264 to enter passage 264' to flow toward the center opening 253 and the pump inlet without restriction. Base plate 258 is truncated on an arcuate line 258a to afford access to central opening 253. Fin segments 256 and 256' project across opening 253 so as to heat the thermoplastic material at the center of container 14 and to exclude pieces of semi-solid material from pump inlet 35. Units 202 can have a circumferential extent of 30° in which case twelve of the units will completely cover the lower surface of plate 250.

In operation, when the follower is lowered into container 14, fins 256 and 256' contact thermoplastic material 16 and melt the same. As the fins sink into the material, the material enters channels 262 and 262' and moves along the channels 262 and 262' toward passage 264. The presence of ports 204 permits the flowable material to enter passage 264' so as to afford substantially unrestricted flow to pump inlet opening 35.

The fin groups 54, 154 and 254 can be constructed by the use of conventional extrusions, by casting or by milling. Additionally the fin groups can be sector shaped or they can be formed in one piece that is substantially congruent to the lower surface of follower 12.

Thus, it will be seen that the present invention provides an improved heat exchanger structure for a thermoplastic dispensing apparatus which substantially increases the delivery rate of such apparatus by increasing the effective use of power input thereof while constricted to a fixed container size. This advantageous mode of operation is achieved by providing a plurality of groups of parallel fins which cover entirely the lower surface of the follower so as to distribute heat uniformly to the material in contact with the follower. Because the channels between adjacent fins are of uniform cross section throughout their lengths, because the channels at their inner ends communicate with radially extending passages, and because the angle between the channels and the passages is an obtuse angle, substantially unimpeded flow toward pump inlet opening 35 is provided. Consequently, the material moves rapidly toward the pump inlet, thereby substantially increasing the output rate of the apparatus.

Although several embodiments have been shown and described, it will be obvious that other adaptations and modifications can be made without departing from the true spirit and scope of the invention.

What is claimed is:

1. In apparatus for dispensing thermoplastic material from a container which apparatus is of the type including a follower having a shape corresponding to the interior of the container, means for urging the follower toward the thermoplastic material in the container, a heat source carried on the follower, and a pump having an inlet in the follower for removing the material, an improved heat exchanger structure for effecting transfer of heat energy from said heat source to the material adjacent the follower to render the material flowable comprising a plurality of groups of rigid heat conductive fins fixed to the follower in heat conductive relation to said heat source, each said group including a plurality of substantially straight parallelly and equally spaced apart fins that define between each adjacent pair a channel having a first extremity, a second extremity remote from said first extremity and a substantially uniform cross section between said extremities, said groups being sufficient in number and configuration to be substantially coextensive with said follower, said groups being oriented so that said first channel extremities are closer to said pump inlet than said second channel extremities, and means for defining a flow passage in communication with the first extremities of said channels and extending to said pump inlet, said flow passage having a cross-sectional area at least as large as that of the channels, said channels intersecting said passage at obtuse angle so as to avoid restriction of flow from said channels into said passage.

2. An improved heat exchanger according to claim 1 wherein said follower is of circular cross-sectional shape, wherein said pump inlet is disposed substantially centrally of said follower, and wherein said fin groups are sector shaped, said sector shaped fin groups having an aggregate angular extent of substantially 360° and a radial extent corresponding to that of the follower so that the fin groups are substantially coextensive with said follower.

3. An improved heat exchanger according to claim 2 wherein each said fin group includes a base plate integral with the fins and secured to the follower, said base plate at the inner radial extremity thereof being truncated along a line so as to avoid restriction of said pump inlet, at least one of said fins extending inward of said line so as to span said inlet to melt and exclude pieces of thermoplastic material from said pump inlet.

4. An improved heat exchanger according to claim 3 wherein said flow passage defining means includes portions of said follower forming grooves extending toward said pump inlet, portions of said base plate in alignment with said grooves being excised to afford communication between said channels and said grooves.

5. An improved heat exchanger according to claim 2 wherein each said sector shaped fin group includes a substantially radially extending fin and a plurality of lateral fins disposed laterally of said radially extending fin, said lateral fins having inner ends terminating along a radial line angularly spaced from said radially extending fin, said radial flow passage being substantially co-linear with said line.

6. An improved heat exchanger according to claim 5 wherein said radially extending fin is disposed substantially centrally of said fin group and wherein a first plurality of said lateral fins are disposed on one side of said centrally disposed fin and wherein a second plurality of said lateral fins are disposed on the other side of said centrally disposed fin.

7. An improved heat exchanger according to claim 5 wherein said radially extending fin is disposed at one angular extremity of said fin group, said radial line being disposed at the opposite angular extremity of said fin group.

8. An improved heat exchanger according to claim 2 wherein said fin group includes a first set of fins having outer extremities adjacent one angular extremity of said sector shaped fin group and a second set of fins having outer extremities adjacent the other angular extremity of said sector shaped fin group, the inner extremities of the fins in said first set being spaced from the inner extremities of the fins in said second set to form a passage that extends radially of said sector shaped fin group to said pump inlet.

9. An improved heat exchanger according to claim 8 wherein said fin group includes a base plate integral with the fins and secured to the follower, said base plate having a lower surface from which the fins extend and an upper surface opposite the lower surface, said base plate defining at least one port in alignment with said passage and extending to said upper surface, means communicating said port at said upper surface to said pump inlet.

* * * * *